United States Patent [19]
Brettschneider et al.

[11] 4,083,341
[45] Apr. 11, 1978

[54] PROCESS AND APPARATUS FOR THE REGULATION OF THE FUEL-AIR MIXTURE OF AN INTERNAL COMBUSTION ENGINE THROUGH THE ADMISSION OF AUXILIARY AIR

[75] Inventors: Johannes Brettschneider, Ludwigsburg; Johannes-Gerhard Bertling, Vaihingen, both of Germany

[73] Assignee: Robert Bosch GmbH, Stuttgart, Germany

[21] Appl. No.: 732,125

[22] Filed: Oct. 13, 1976

[30] Foreign Application Priority Data

Oct. 16, 1975 Germany .............................. 2546310

[51] Int. Cl.² .......................................... F02M 23/04
[52] U.S. Cl. ............................ 123/124 B; 123/119 D; 123/119 EC; 123/139 AW; 261/50 A; 261/45; 261/54
[58] Field of Search ....... 123/119 D, 119 DB, 124 R, 123/124 B, 124 A, 127, 119 EC, 139 AW; 261/50 A, 45, 54

[56] References Cited
U.S. PATENT DOCUMENTS

| | | |
|---|---|---|
| 3,977,375 | 8/1976 | Laprade et al. .................. 123/124 B |
| 4,010,722 | 3/1977 | Laprade et al. .................. 123/124 R |
| 4,015,568 | 4/1977 | Horiye et al. .................... 123/124 R |

*Primary Examiner*—Wendell E. Burns
*Attorney, Agent, or Firm*—Edwin E. Greigg

[57] ABSTRACT

A process and related apparatus for regulating the fuel-air mixture delivered to the combustion chambers of an internal combustion engine by the admission of auxiliary air the quantity of which corresponds with the quantity of the aspirated fresh air forms the subject of this invention. An air bypass line is provided for bypassing a venturi constriction disposed in a suction tube upstream of a throttle flap valve. Associated with the air bypass line are a pressure regulating valve, a bypass throttle device and a control circuit including a pair of shut-off valves, or alternatively a three way valve, with an appropriate control for controlling the valves and accordingly the reduced pressure produced by the venturi constriction, which is communicated to the bypass throttle device, or the control pressure of the pressure regulating valve. With the noted control, the reduced pressure or the control pressure of the pressure regulating valve may be varied according to the operational behavior of the engine, and as a result control the auxiliary air flow through the air bypass line.

16 Claims, 8 Drawing Figures

PROCESS AND APPARATUS FOR THE REGULATION OF THE FUEL-AIR MIXTURE OF AN INTERNAL COMBUSTION ENGINE THROUGH THE ADMISSION OF AUXILIARY AIR

BACKGROUND OF THE INVENTION

The present invention relates to a process and an apparatus for the regulation of the fuel-air mixture delivered to the combustion chambers of an internal combustion engine, through the admission of auxiliary air in correspondence with the aspirated fresh air quantity. The auxiliary air is admitted via an air-bypass line around a measuring member measuring the fresh air quantity.

An apparatus for the execution of such a process is disclosed in the DT-OS 24 31 046 (laid open German application). This application discloses a valve in an air-bypass line entering the suction tube of the intake manifold of the internal combustion engine downstream of the throttle flap which is actuated by the throughput dependent reduced pressure developed within a venturi in the suction tube to accomplish the allocation of the auxiliary air. This reduced pressure is modified by a valve actuated in correspondence with a signal from an oxygen measuring probe within the exhaust system of the internal combustion engine. However, only an additive modification of the auxiliary air admitted via the valve in the air bypass line can be achieved with this apparatus, which factor entails the disadvantage that the regulation works comparatively slowly, and also that its effect differs for differing operational regions of the internal combustion engine.

OBJECTS AND SUMMARY OF THE INVENTION

It is, therefore, an object of the present invention to provide the existing state-of-the-art with a process according to which an exact and rapid regulation of the composition of the fuel-air mixture to be combusted in an internal combustion engine may be accomplished.

This object is achieved according to the present invention by gauging the aspirated fresh-air quantity through the reduced pressure (vacuum) in a venturi, and by varying, in correspondence with this reduced pressure, the cross-sectional area of the air-bypass line, where the pressure drop can be held constant with the aid of a pressure regulating valve, whereby the reduced pressure or the control pressure of the pressure regulating valve may be varied according to the operational behavior of the internal combustion engine through the complete or the partial substitution by another, preferably higher, pressure.

A further aspect of the process, according to the present invention, consists in the fact that the magnitude of the substitute pressure is kept in a constant relationship with the reduced pressure or the control pressure of the pressure regulating valve. This yields the advantage of substantially improving the integration behavior of the regulator whenever pneumatic integration takes place during the regulation of the mixture.

It is a related and further object of the present invention to provide the existing state-of-the-art with an apparatus for effecting the process noted above.

This object is achieved in an internal combustion engine having an arbitrarily displaceable throttle flap in a suction tube, and upstream thereof a venturi from whose most constricted cross-sectional region a pressure extraction line leads to a control pressure chamber of a positioning device of a bypass throttle member in an air bypass line bypassing the venturi, by installing in the air bypass line a pressure regulating valve containing two working chambers and a throttle member actuated by a positioning member which separates the two working chambers, with one of the working chambers being connected to the air bypass line upstream of the bypass throttle device and the other downstream of the bypass throttle device each via a respective connecting line; and by connecting via a pressure line the control pressure chamber of the positioning device or one of the working chambers of the pressure regulating valve to a pressure source possessing another, preferably higher, magnitude through a valve controlled in accordance with the operational behavior of the internal combustion engine.

According to one configuration of the present invention, the air-bypass line enters the suction tube downstream of the venturi and of the throttle flap. With this embodiment, the λ-regulation takes place at a constant fuel delivery rate, and the admission of auxiliary air downstream of the throttle flap results in a faster regulation. In this case, the turning moment of inertia created by the combustion engine at air quantities of $\lambda \geqq 1$ is least λ-dependent, so that a regulation of the dynamic stability of the internal combustion engine is advantageous for this configuration of the present invention.

According to another configuration of the present invention, the air-bypass line enters the suction tube between the most constrictive cross-section of the venturi and the throttle flap, whereby the regulation takes place at a constant air delivery rate. The turning moment of inertia created by the internal combustion engine is here least λ-dependent in the region where $\lambda \leqq 1$, so that this configuration of the present invention is advantageous for a regulation towards $\lambda = 1$.

A further advantageous configuration of the present invention consists in the fact that the regulated pressure in the air-bypass line between the bypass throttle member and the throttle member of the pressure regulating valve serves as the pressure source. This pressure maintains a constant relationship with respect to the control pressure of the pressure regulating valve, so that a selective variation between the two pressures can yield symmetrical pressure changes per unit time, which favor the regulation and integration procedures.

DESCRIPTION OF THE PREFERRED EMBODIMENTS

Figure 1:
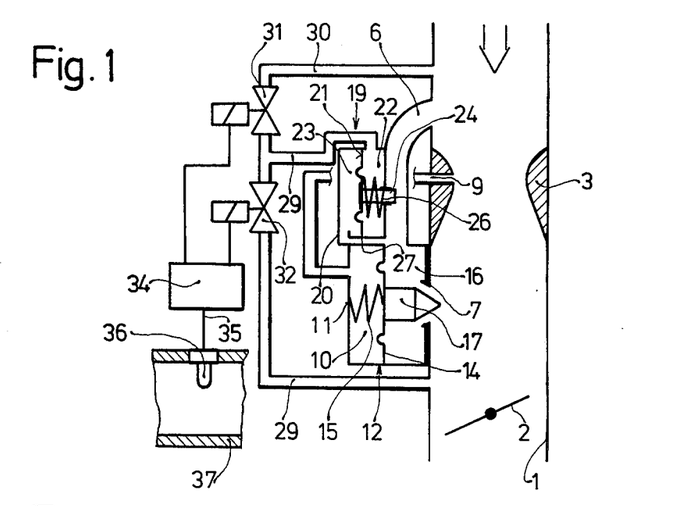
FIG. 1 is a schematic illustration of a first exemplary embodiment of the apparatus, according to the present invention.

FIG. 1 is a schematic representation of part of the aspiration system of an internal combustion engine, not further delineated. The aspiration system features a suction tube 1 containing an arbitrarily displaceable throttle flap 2. Situated upstream of the throttle flap 2 is a suction tube constriction in the form of a venturi 3, through which fresh air is delivered in the direction of the arrow, via an air filter (not shown) to the internal combustion engine in accordance with the given position of the throttle flap 2. Upstream of the venturi 3 an air-bypass line 6 branches off from the suction tube 1 and then re-enters the suction tube 1 between the venturi 3 and the throttle flap 2 via the opening defined by a valve seat 7. From the most constricted part of the venturi 3 a pressure communicating line 9 leads to a control pressure chamber 10 of a pressure cell 11, serving as a positioning device, and comprising part of a bypass throttle device 12. The control pressure chamber 10 is separated from a working chamber 16 in the pressure cell 11 by a positioning membrane 14, which is biased by the load of a spring 15 situated within the control pressure chamber 10. The air-bypass line 6, which communicates with the suction tube 1 via the valve seat 7, enters sideways into the working chamber 16. A bypass throttle member 17 in the form of a pin having an approximately conical contour, affixed to the positioning membrane 14, cooperates with the valve seat 7.

A pressure regulating valve 19, consisting of a pressure cell 20 separated into two working chambers 22 and 23 by a positioning membrane 21, is further disposed within the air-bypass line 6 upstream of the working chamber 16. A slide member 24, constituting the throttle member of the air-bypass line, is attached to the positioning membrane 21. A pressure spring 26 located in the working chamber 22 presses the positioning membrane 21 toward the opened direction of the slide member 24. The working chamber 23 communicates with the air-bypass line 6 in the region between the slide member 24 and the bypass throttle member 17 via a connecting line 27.

The working chamber 22 is linked via a connecting line 29 to the suction tube 1 between the throttle flap 2 and the venturi 3, and is thusly exposed to the pressure prevailing therein. A pressure line 30 further enters the connecting line 29, linking it to the suction tube 1 upstream of the venturi 3. It should be noted that the line 30 can also enter the working chamber 22 directly. Electromagnetic valves 31 and 32 are respectively located in the pressure line 30, and in the connecting line 29 between its junction with the line 30 and the suction tube 1. The magnetic winding of the electromagnetic valve 31 in the pressure line 30, as well as that of the electromagnetic valve 32, is connected with a regulator 34. This regulator receives a signal via a line 35 from a well known oxygen probe 36 within a part 37 of an exhaust system, not further delineated, of the internal combustion engine.

The apparatus, according to FIG. 1, operates as follows:

A reduced pressure corresponding to the throughflow of the air quantity is created, in a well known manner, within the venturi 3, and this reduced pressure vacuum is communicated to the control pressure chamber 10 via the communicating line 9. An increase of the reduced pressure causes the displacement of the positioning membrane 14 against the opposing force of the spring 15, and of the bypass throttle device 17 from the valve seat 7 toward the opened direction. The throttle device 17 is, therefore, displaced in correspondence with the air quantity flowing through the venturi 3, in such a way as to vary the corss-sectional area of the orifice at the valve seat 7 of the air-bypass line 6 in accordance with the aspirated fresh air quantity. The working chambers 22 and 23 of the pressure regulating valve 19 are respectively connected downstream and upstream of the throttle device 17 via the connecting lines 29 and 27. According to the combination of the selection of the spring 26 and of the configuration of the throttle slide member 24, the pressure regulating valve 19 maintains a constant pressure gradient drop at the cross-sectional area of the orifice determined by the throttle device 17. When, as a result of a displacement of the throttle device 17, this pressure relationship is disturbed, whereby the pressure in the suction tube 1 between the venturi 3 and the throttle flap 2 gains a stronger influence within the working chamber 16 as the throttle device 17 moves toward the opened direction, then the pressure established in the working chamber 16 is also conducted to the working chamber 23. Since the pressure in the suction tube 1 between the venturi 3 and the throttle flap 2 is lower than the pressure upstream of the venturi, the working chamber 23 experiences a pressure decrease causing the positioning membrane 21 to move, together with the slide member 24, toward the opened direction of the slide member 24, under the combined effect of the force of the spring 26 and the pressure in the working chamber 22. Through the presently lessened throttling of the air-bypass line 6 by the slide member 24, the pressure upstream of the venturi 3 can now exert a stronger influence downstream of the slide member 24, so that in conjunction with the just described regulating process, a pressure gradient of equal magnitude again appears at the cross-sectional area of the orifice controlled by the bypass throttle device 17. In this manner auxiliary air in quantities proportional to the fresh air quantity throughflow at the venturi 3 can be conducted to the suction tube 1 via the bypass 6.

It is to be understood, that in the above described regulating process, the valve 32 in the connecting line 29 was open, and the valve 31 in the pressure line 30 was closed.

A modulation of the pressure gradient at the bypass throttle device 17 can be the result, for example, of increasing the pressure in the working chamber 22. This occurs when valve 31 is opened, thereby permitting the greater pressure upstream of the venturi 3 to reach the working chamber 22 via the pressure line 30. The pressure upstream of the venturi 3 is the same as the pressure immediately downstream of an aspiration air filter (not shown), and ahead of the aspiration system of the internal combustion engine, and it is essentially constant. Naturally, the admission of auxiliary air could also take place via its own independent air filter.

In addition, this auxiliary air can also be admitted at another constant pressure, which then manifests preferably the same, or a higher, pressure level. The pressure adjustment is obtained by simultaneously actuating the valves in a certain keying ratio (relative duration of actuation) by means of a regulator 34 in such a way as to open the valve 31 when the valve 32 closes, and vice versa. In this manner the working chamber 22 is respectively connected monentarily once with the suction tube 1 upstream of the venturi 3, and once the suction tube section between the venturi 3 and the throttle flap 2. Depending on the given keying ratio, one or the other pressure then predominates. The control pulses for the electromagnetic valves 31 and 32, delivered by the regulator 34, are produced in accordance with the signal from the oxygen measuring probe 36. This probe is of a familiar construction, which exhibits a change of potential in the region of the numerical air quantity $\lambda =$ 1. This signal indicates respectively whether an oxygen deficiency or an oxygen surplus exists within the exhaust gases of the internal combustion engine. Such regulators are known and have been described in a number of publications, and hence need not be further described here. Depending upon the design of the regulator, an analog signal corresponding to the probe signal, representing, for example, the frequency of occurrence of the probe signal, can also be produced, which then actuates a three-way valve via a positioning magnet, instead of the use of the oppositely keyed electromagnetic valves 31 and 32. A corresponding valving arrangement of that kind is shown in FIG. 2 and is discussed below.

In place of the two electromagnetic valves 31 and 32, a single valve 32 can alternatively be installed in the pressure line, which valve is then positioned with an analog signal by a positioning magnet. In that embodiment, a throttle is preferably included in the connecting line 29 downstream of the entrance thereto of the pressure line 30. With an appropriate well known regulator, a three-way switch valve can be alternatively utilized instead of the three-way valve actuated by analog signals, whereby the three-way switch valve is once again actuated with a variable keying ratio by the correspondingly equipped regulator.

However, the regulator is not limited to the use of the signal from an oxygen measuring probe. In a corresponding manner, other operational parameters designating the operational behavior of the internal combustion engine can also be utilized in the control process. For example, the dynamic stability of the internal combustion engine is a potential factor. In a well known utilization thereof, a detector measures the distribution of the pressure patterns in the combustion chambers of the internal combustion engine. It has also been further proposed to modulate the regulation of the air-fuel mixture by means of the measurement of ionic currents within the combustion chambers of the internal combustion engine. That kind of regulator can also be utilized with the apparatus herein described, and the process herein presented. Other methods for the determination of the composition of the exhaust gases, such as are obtainable, for example, by temperature measurement, can also be used to generate the desired regulation factor. The apparatus described here is effective for all the operational regions of the internal combustion engine, excepting only the idling region. By means of the admission of auxiliary air upstream of the throttle flat 2, a constant air delivery gradient, representing a constant filling of the cylinders, can be maintained.

Figure 2:
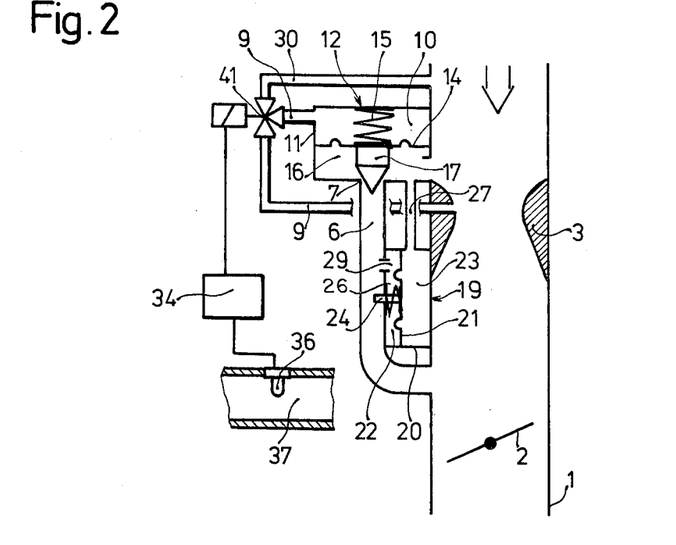
FIG. 2 is a schematic illustration of a second exemplary embodiment of the present invention having an altered sequence of the arrangement of the pressure regulating valve and the bypass throttle member.

In the exemplary embodiment according to FIG. 2, the relative locations of the bypass throttle device and of the pressure regulating valve were reversed. In this embodiment, the same reference numerals are applied to the similar respective parts in FIG. 1. The air-bypass line 6 branching off upstream of the venturi 3 continues through the working chamber 16 of the pressure cell 11 of the bypass throttle apparatus 12. The exit of the air-bypass line 6 from the working chamber 16 is provided by the valve seat 7, which cooperates with the bypass throttle device 17. The control pressure chamber 10 communicates with the most constricted part of the venturi 3 via the pressure communicating line 9. A three-way valve 41, located in the pressure communicating line 9, communicates with the suction tube 1 upstream of the venturi 3 via the pressure line 30. The three-way valve 41 is controlled by the regulator 34 in accordance with the signals from the oxygen measuring probe 36 in the part 37 of the exhaust system of the internal combustion engine. As described in the example according to FIG. 1, the three-way valve 41 can be implemented as a switch valve or as a positioning valve, and is correspondingly controlled respectively either by keying, or by an analog signal, from the regulator 34. In addition, just as in the exemplary embodiment according to FIG. 1, this arrangement permits the use of two valves, or as the case may be of one valve, which then works in conjunction with a throttle valve in connecting line 29. In contrast to the exemplary embodiment according to FIG. 1, in the exemplary embodiment according to FIG. 2 the control pressure in the control pressure chamber 10 is modulated, and not the pressure of the pressure regulating valve 19, although both processes are feasible for both arrangements. In this embodiment, the pressure regulating valve 19 is situated downstream of the bypass throttle apparatus 12. As in the first exemplary embodiment, the pressure cell 20 of the pressure regulating valve 19 is divided into the working chambers 22 and 23 by the positioning membrane 21. The slide member 24 is attached to the positioning membrane 21, and is biased, together with the positioning membrane, toward the opened direction by the spring 26. The working chamber 23 communicates with the working chamber 16, that is to say upstream of the bypass throttle device 17, via the connecting line 27; whereas the working chamber 22 communicates with the air bypass line 6 downstream of the bypass throttle device 17 via a connecting line 29 reduced as shown to a connecting passage.

The bypass throttle device 17 is moved toward the opened direction in opposition to the force of the spring 15 by the positioning membrane 14 for an increase in the fresh air throughflow, and consequently for an increase in the reduced pressure, with the pressure in the air-bypass line 6 downstream of the bypass throttle device 17 rising simultaneously. The similarly risen pressure in the working chamber 22 now causes a displacement of the positioning membrane 21 toward the opened direction, so that the pressure prevalent in the suction tube 1 downstream of the venturi exerts a greater influence in the air-bypass line 6, thus lowering the previously risen pressure. In this manner, as in the preceding exemplary embodiment according to FIG. 1, a given desired pressure gradient is obtained at the bypass throttle device 17 according to the construction of the spring 26 and of the positioning membrane 21, and according to the opening characteristics of the slide member 24. As in the exemplary embodiment according to FIG. 1, this apparatus is effective, with the exception of the idling region, in all the operational regions of the internal combustion engine.

Figure 3:
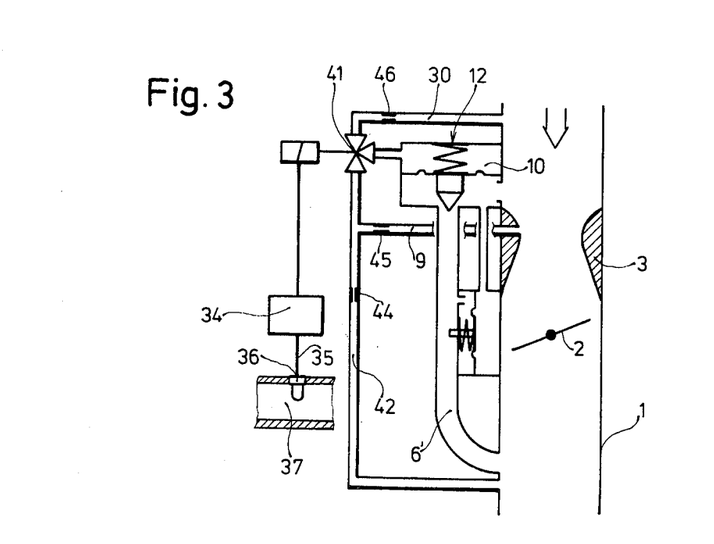
FIG. 3 is a schematic illustration of a modified configuration of the exemplary embodiment according to FIG. 2.

According to FIG. 3, a third exemplary embodiment of the present invention is constructed essentially like the second exemplary embodiment of FIG. 2. The apparatus, according to FIG. 3, differs in that here the air-bypass line 6' enters the suction tube 1 downstream of both the venturi 3 and the throttle flat 2. Furthermore, an auxiliary connecting line 42 branches off from the pressure communicating line 9 in the section between the three-way valve 41 and the venturi 3, and leads to the suction tube 1 downstream of the throttle flap 2. In this development of the apparatus, according to the present invention, the pressure in the control pressure chamber 10 can be varied between the pressure upstream of the venturi 3 and the reduced pressure created within the venturi. This holds true firstly for all the operational regions of the internal combustion engine except idle. During idling of the internal combustion engine, that is to say when the throttle flap 2 is closed, the pressure in the control pressure chamber 10 can be varied between the pressure in the suction tube 1 upstream of the venturi 3, and a lesser pressure derived from the combination of the aspect ratio of the throttles 44 and 45 and the pressure in the suction tube 1 downstream of the throttle flap 2. This reduced pressure is communicated to the control pressure chamber 10, in accordance with the given selected position of the three-way valve 41, via the auxiliary connecting line 42. By means of the throttle 44 located in the auxiliary connecting line 42, and of a throttle 45 in the pressure communicating line 9 between the venturi 3 and the junction with the auxiliary connecting line 42, and by means of a throttle 46 in the pressure line 30, an equalization of the pressures actually reaching the control pressure chamber 10 for the given selected positions of the three-way valve 41 can be achieved. This is carried out in such a manner that the pressure changes per unit time in the control pressure chamber 10 are approximately equal for preferably all the operational regions of the internal combustion engine, independent of the selected position of the three-way valve. In order to enhance the pneumatic integration process, the volume of the control pressure chamber 10 may be correspondingly increased by means of a supplementary volume. With an appropriate dimensioning of the delineated lines, the throttles 44, 45 and 46 may also be omitted entirely, especially whenever variable analog valves (proportional valves) are used instead of the switchvalve. The throttles used for the enhancement of the integration process and described here in conjunction with FIG. 3, may, of course, also be employed within the corresponding lines in the exemplary embodiment according to FIGS. 1 and 2.

Figure 4:
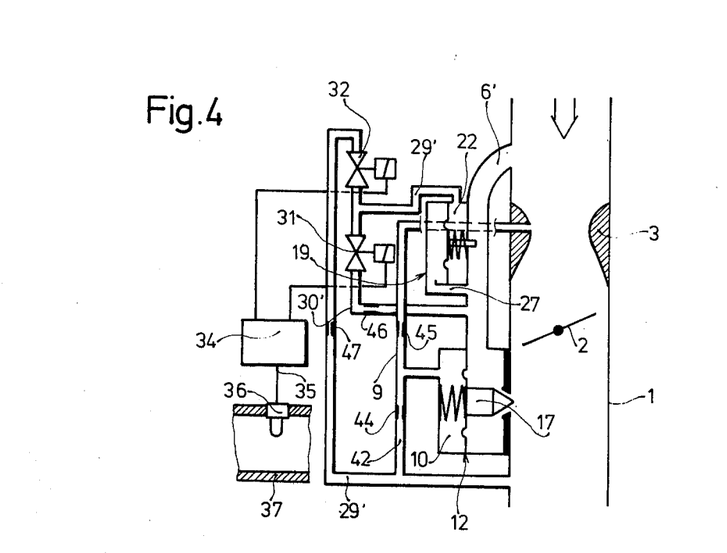
FIG. 4 is a schematic illustration of a third exemplary embodiment of the apparatus, according to the present invention.

The exemplary embodiment according to FIG. 4 corresponds substantially to the exemplary embodiment according to FIG. 1 with respect to the arrangement of the pressure regulating valve 19 and the bypass throttle device 12. Similar components of the embodiments are therefore designated with the same reference numeral. To prevent repetition, references concerning the function of those components are made to the description according to FIG. 1. Departing from the exemplary embodiment according to FIG. 1, however, the air-bypass line 6' here leads around both the venturi 3 and the throttle flap 2, entering the suction tube 1 downstream of the throttle flap 2. As in the exemplary embodiment according to FIG. 3, a larger pressure difference is resultantly available up to the fullload region, so that the collective cross-sectional areas of the bypass throttle device 17 and of the slide member 24 at the pressure regulating valve can be kept accordingly smaller.

In a corresponding application of the embodiment according to FIG. 3, an auxiliary connecting line 42 leading from the control pressure chamber 10 to the suction tube 1 downstream of the throttle flap 2, is herein also provided. In this way it is possible to achieve an approximately throughflow dependent displacement of the bypass throttle device 17 even in the idling region of the internal combustion engine, while the throttle flap 2 is closed, with an appropriate design of the throttle 44 located in the auxiliary connecting line 42. The bypassed airflow through the pressure communicating line 9 and the auxiliary connecting line 42 can be limited by means of the throttle 45 in the pressure communicating line 9.

Departing from the exemplary embodiment according to FIG. 1, a pressure line 30' leads from the air-bypass line 6' in the region between the slide member 24 and the bypass throttle device 17, and enters the connecting line 29' which connects the working chamber 22 of the pressure regulating valve 19 to the suction tube 1 downstream of the throttle flap 2. As in the exemplary embodiment according to FIG. 1, an electromagnetic valve 31 is situated in the pressure line 30', and an electromagnetic valve 32 in the connecting line 29' between its junction with the pressure line 30', and the suction tube 1. Both valves receive control pulses from a regulator 34 in accordance with the signal from an oxygen measuring probe 36 connected to the regulator 34 by the line 35, and located in the part 37 of the exhaust system of the internal combustion engine. The description of the pressure control process in the working chamber 22 for FIG. 1 applies here as well. To enhance the integration process, a throttle 46 in the pressure line 30' and a throttle 47 in the connecting line 29', may be employed herein also. In comparison to the apparatus according to FIG. 1, the apparatus according to FIG. 4 possesses the advantage that the pressure regulation in the working chamber 22 is accomplished here by varying the chamber pressure between two pressures which stand in a fixed relationship with each other. This is possible because the other pressure, which substitutes completely or partly for the pressure derived from the suction tube 1, downstream of the throttle flap 2, consists of the pressure within the air-bypass line 6 upstream of the throttle device 17, which pressure is regulated to possess a constant pressure gradient. A genuinely multiplicative interaction with the bypassed air quantity controlled by the bypass throttle device 17 can be achieved here without great precision in structural dimensioning. Through the appropriate proportioning or dimensioning of the throttles 46 and 47, as well as of the volume of the working chamber 22, a favorable integrating process can be achieved.

The exemplary embodiment according to FIG. 1 may be converted to the analog mode of the exemplary embodiment according to FIG. 4, with similar advantages accruing. In the exemplary embodiments according to FIGS. 1 and 2, an auxiliary connecting line having a correspondingly appropriate construction may be advantageously connected via throttles with the pressure communicating line 9, in order to achieve regulation even during idling operation. The pressure regulating valve and the bypass throttle apparatus were only schematically represented in the preceding exemplary embodiments. In place of the positioning membrane, appropriate spring loaded pistons may, of course, be used as well. However, in the exemplary embodiments of FIGS. 2 and 3, the exemplary embodiments according to the FIGS. 5 and 6 may be advantageously substituted for the pressure regulating valve 19 and slide member 24.

Figure 5:
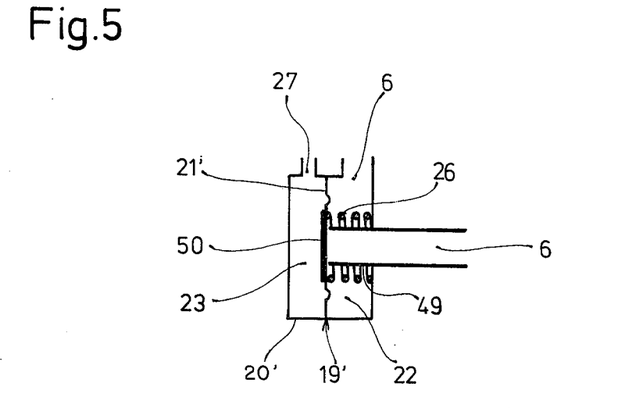
FIG. 5 is a schematic illustration of a first form of the embodiment of the pressure regulating valve.
Figure 6:
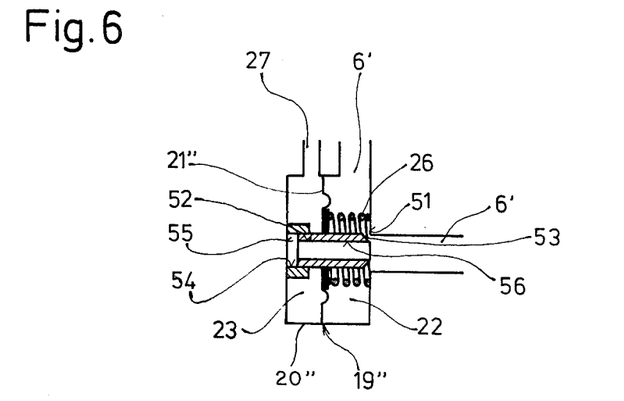
FIG. 6 is a schematic illustration of a different configuration of the pressure regulating valve of the apparatus, according to the present invention.

In the exemplary embodiment according to FIG. 5, the pressure cell 20' of the pressure regulating valve 19' is divided into two working chambers 22 and 23 by the positioning membrane 21'. The working chamber 23 is herein connected with the air-bypass line 6 upstream of the bypass throttle device 17 via the connecting line 27, as is the case in the exemplary embodiments according to FIGS. 2 and 3. The air-bypass line 6 enters the other working chamber 22 sideways, and continues on over a stud-shaped part 49, thereafter once again exiting the working chamber 22 perpendicularly to the positioning membrane 21'. The studshaped part 49 protrudes to within the immediate proximity of the positioning membrane 21', which is there equipped with a valve plate 50. The positioning membrane 21' has a force exerted against it by the pressure spring 26 in the working chamber 22. The cross-sectional area of the throughflow of the air-bypass line 6 is varied according to the displacement of the positioning membrane 21' by means of the valve plate 50. This exemplary embodiment of the pressure regulating valve may be utilized in those cases where no significant reduced pressures develop in the air-bypass line downstream of the pressure regulating valve. This is the case, for example, in the exemplary embodiment according to FIG. 7. FIG. 6 represents another form of the embodiment of the pressure regulating valve, which may even be utilized for the exemplary embodiment according to FIG. 3, wherein the air-bypass line 6 enters the suction tube downstream of the throttle flap 2.

In the pressure regulating valve 19" according to FIG. 6, a pressure cell 20" is once again divided into the working chamber 23 and the working chamber 22 by a positioning membrane 21". The working chamber 23 communicates with air bypass line 6' upstream of the throttle device 17 via the connecting line 27, as shown, for example, in FIG. 3. The air-bypass line 6' enters the working chamber 22 sideways, and once again exits from the pressure cell centrally and perpendicularly to the positioning membrane 21'. At this exit, the pressure cell features a valve seat 51, which cooperates with a piston 52. The face 53 of the piston is approximately conical. The piston is firmly attached to the positioning membrane 21", and protrudes beyond it through the working chamber 23 into a close fitting bore 54. The rear face 55 of the piston 52 communicates with the face 53 via an integral longitudinal bore 56. The membrane 21" is loaded toward the opened direction by the spring 26 located in the working chamber 22.

The bore 56 relieves the pressure upon the piston 52 along the longitudinal direction, so that even when the piston 52 is in its closed position, and at high suction tube reduced pressures, the membrane can accomplish its positioning movement without being influenced by the suction tube pressure. This pressure relief can, of course, also be accomplished by a connecting line leading from the air-bypass line 6' downstream of the piston to the bore 54.

Figure 7:
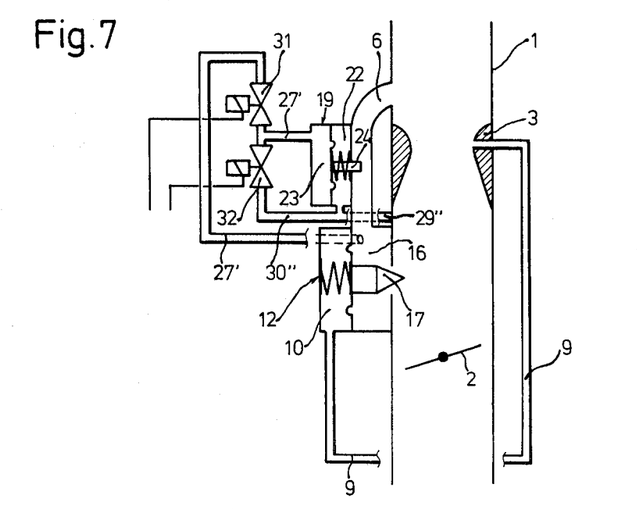
FIGS. 7 and 8 illustrate two further configurations of the exemplary embodiments according to FIGS. 1 and 2.
Figure 8:
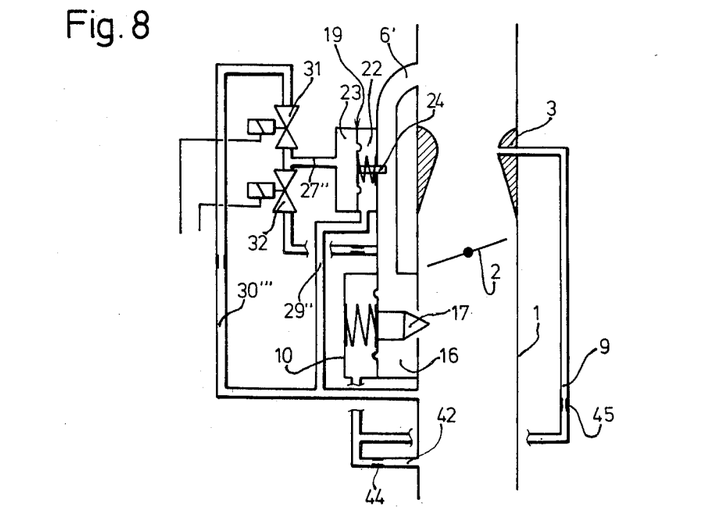

FIGS. 7 and 8 depict two further exemplary embodiments of the present invention. These exemplary embodiments correspond substantially to the exemplary embodiments according to FIGS. 1 and 4, wherein the pressure regulating valve is situated upstream of the throttle device, and wherein the air-bypass line enters the suction tube upstream, and respectively downstream, of the throttle flap 2. A description of the principal components of these two exemplary embodiments is referenced to the corresponding description of FIGS. 1 and 4, with similar components herein having the same reference numerals.

Departing from the exemplary embodiment according to FIG. 1, in the exemplary embodiment according to FIG. 7 an appropriate regulation of the valves 31, 32 varies the pressure in the working chamber 23, rather than the pressure in the working chamber 22 of the pressure regulating valve 19. On the other hand, the actuation of the bypass throttle apparatus 12 remains the same as that of the exemplary embodiment according to FIG. 1. As is true there, the control pressure chamber 10 is here also connected with the most constricted part of the venturi 3, via the pressure communicating line 9.

The working chamber 22 of the pressure regulating valve 19 communicates permanently via a connecting line 29" or as the case may be through the bypass line downstream of the bypass throttle device 17, with the suction tube section between the venturi 3 and and the throttle flap 2. The working chamber 23 communicates via a connecting line 27' with the working chamber 16 of the bypass throttle apparatus 12, and accordingly with the air-bypass line section between the slide member 24 and the bypass throttle device 17. The electromagnetic valve 31 is located in the connecting line 27'. In addition, the pressure line 30", containing an electromagnetic valve 32, enters the connecting line 27' between the electromagnetic valve 31 and the working chamber 23, and thence leads to the connecting line 29", and accordingly to the suction tube section between the venturi 3 and the throttle flap 2.

The actuation of the electromagnetic valves 31 and 32 is carried out in the same manner as described in the exemplary embodiment according to FIG. 1. As noted therein, a three-way valve 41 may be substituted here for the two electromagnetic valves 31 and 32, at the junction of connecting line 27' and pressure line 30".

With this arrangement, as with the exemplary embodiment according to FIG. 1, the pressure upstream and downstream of the bypass throttle device 17 is respectively conducted to the working chambers 22 and 23 of the pressure regulating valve 19. Departing from the exemplary embodiment according to FIG. 1, however, the pressure in the working chamber 23 is here varied in accordance with the operational behavior of the internal combustion engine, namely in the range between the pressure in the suction tube and the pressure in the working chamber 16. Since the pressure gradient at the bypass throttle device 17 is held to a constant value by the pressure regulating valve, a constant pressure gradient is available here, as it similarly is, in the exemplary embodiment according to FIG. 4, for the regulation. Hence equal conditions prevail throughout the collective regulation range, so that a constant integration behavior as well as a genuinely multiplicative interaction with the quantitative apportionment of the bypass air, predetermined by the bypass throttle device 17, will result.

Corresponding to FIG. 7, a departure from the exemplary embodiment according to FIG. 4 is represented in FIG. 8. Here, too, the actuation of the bypass throttle device 17 results from the variation of the pressure in the control pressure chamber 10, which communicates not only with the most constricted cross-sectional area in the venturi 3 via the pressure communicating line 9 containing the throttle 45, but also communicates with the suction tube 1 downstream of the throttle flap 2 via the auxiliary connecting line 42. Here, too, the auxiliary connecting line 42 contains a throttle 44.

Departing from the exemplary embodiment according to FIG. 4, here the working chamber 22 of the pressure regulating valve 19 communicates permanently with the suction tube 1 downstream of the throttle flap 2 via the connecting line 29". The working chamber 23 of the pressure regulating valve 19 communicates with the air-bypass line 6' between the slide member 24 and the bypass throttle device 17 via the connecting line 27". The electromagnetic valve 32 is located in the line 27". In addition, a pressure line 30''', connected to the suction tube 1 downstream of the throttle flap 2, enters the connecting line 27" between the electromagnetic valve 32 and the working chamber 23. The pressure line 30''' contains the electromagnetic valve 31.

Departing from the exemplary embodiment according to FIG. 4, here the pressure in the working chamber 23 is varied in accordance with the operational behavior of the internal combustion engine by means of the actuation of the electromagnetic valves 31 and 32. The control of these valves is accomplished in the same manner as in the previously described exemplary embodiments.

The pressure in the working chamber 23 is hence variable in the range between the pressure downstream of the throttle device 17, or as the case may be, of the pressure in the suction tube 1 downstream of the throttle flap 2, and the pressure in the air-bypass line 6' between the slide member 24 and the throttle device 17. As is true for the exemplary embodiment according to FIG. 7, the essential advantage here consists in the fact that the pressure difference, in the range of which the pressure in the working chamber 23 is varied, is constant over the entire regulation range, so that a good integration behavior and a genuinely multiplicative interaction with the bypass air apportionment are thus achieved.

What is claimed is:

1. A process for regulating the composition of the fuel-air mixture delivered to the combustion cylinders of an internal combustion engine, having a suction tube through which a quantity of fresh air is aspirated and within which there is disposed a venturi constriction, an air-bypass line through which auxiliary air is admitted to bypass the venturi constriction, and a pressure regulating valve, comprising the steps of:
   (a) gauging the aspirated fresh air quantity in the suction tube via the reduced pressure in the venturi;
   (b) varying the cross-sectional area of the air bypass line in accordance with the reduced pressure in the venturi;
   (c) maintaining a substantially constant pressure drop in the air-bypass line utilizing the pressure regulating valve by varying the pressure distribution in the pressure regulating valve; and
   (d) varying the control pressure in the pressure regulating valve in accordance, with the operational behavior of the engine to a preferably higher pressure value.

2. The process as defined in claim 1, wherein the relationship between the control pressure and the preferably higher pressure value is held constant.

3. An apparatus for regulating the composition of the fuel-air mixture delivered to the combustion cylinders of an internal combustion engine, having a suction tube through which a quantity of fresh air is aspirated and within which there is disposed an arbitrarily displaceable throttle flap and a venturi constriction upstream thereof, comprising:
   (a) an air-bypass line connected to the suction tube for bypassing the venturi constriction;
   (b) a bypass throttle device located to engage with the air-bypass line, said bypass throttle device having a control pressure chamber, a bypass throttle member and a positioning member;
   (c) a pressure communicating line connected between the venturi constriction and the control pressure chamber of the bypass throttle device for communicating the reduced pressure developed at the venturi constriction to the control pressure chamber;
   (d) a pressure regulating valve connected to the air-bypass line, said pressure regulating valve having means defining two chambers separated by a positioning component, and a throttle member actuatable by the positioning component;
   (e) a connecting line connecting one of the two chambers to the air-bypass line upstream of the bypass throttle device;
   (f) a further connecting line connecting the other of the two chambers to the air-bypass line downstream of the bypass throttle device;
   (g) a pressure line connecting the control pressure chamber to a source of higher pressure; and
   (h) valve means connected to the pressure line for regulating the pressure in the control pressure chamber in accordance with the operational behavior of the engine.

4. The apparatus as defined in claim 3, further comprising:
   (i) an auxiliary connecting line for connecting the control pressure chamber with the suction tube downstream of the throttle flap;
   (j) throttle means located within the auxiliary connecting line; and
   (k) throttle means located within the pressure communicating line.

5. The apparatus as defined in claim 3, wherein the air-bypass line is connected to the suction tube downstream of the venturi constriction and the throttle flap.

6. The apparatus as defined in claim 3, wherein the air-bypass line is connected to the suction tube between the venturi constriction and the throttle flap.

7. The apparatus as defined in claim 3, wherein the pressure line is connected to the suction tube upstream of the venturi constriction.

8. The apparatus as defined in claim 3, wherein the pressure line is connected to the air-bypass line between the bypass throttle device and the throttle member of the pressure regulating valve.

9. The apparatus as defined in claim 3, wherein the apparatus further comprises means for connecting the control pressure chamber to one of the two chambers of the pressure regulating valve, and wherein the pressure within the other of the two chambers of the pressure regulating valve serves as the source of higher pressure.

10. The apparatus as defined in claim 3, wherein the positioning component of the pressure regulating valve is a positioning membrane which is firmly attached to the throttle member.

11. The apparatus as defined in claim 10, wherein the throttle member is a valve plate, wherein the pressure regulating valve also has a spring disposed within one of the two chambers, wherein the air-bypass line includes a stud-shaped part which protrudes into the chamber having the spring disposed therein, and wherein the valve plate forms a valve seat for the stud-shaped part and is moved toward the opened direction by the spring.

12. The apparatus as defined in claim 10, wherein the throttle member is a piston which extends into both of the two chambers of the pressure regulating valve, said piston defining a bore therethrough, wherein a valve seat is defined in one of the two chambers which is engaged by one end of the piston, wherein means defining a bore is located within the other of the two chambers into which the other end of the piston is engaged and guided, and wherein said bore within said piston defines a communication with the air-bypass line downstream of the throttle member.

13. The apparatus as defined in claim 3, wherein the valve means includes a shut-off valve, wherein the apparatus further comprises:
(i) a shut-off valve connected to the further connecting line; and
(j) a regulator connected to both shut-off valves, and wherein said shut-off valves are simultaneously actuated and oppositely keyed by the regulator in accordance with the operational behavior of the engine.

14. The apparatus as defined in claim 3, wherein the valve means includes a three-way valve to which the pressure communicating line is also connected.

15. The apparatus as defined in claim 14, wherein the three-way valve is constructed in the form of a three-way switch valve.

16. The apparatus as defined in claim 3, further comprising:
(i) a regulator connected to the valve means, and wherein said valve means is actuatable in a given keying ratio by the regulator in accordance with the operational behavior of the engine.

* * * * *